United States Patent
Roels et al.

(10) Patent No.: US 10,632,896 B2
(45) Date of Patent: Apr. 28, 2020

(54) MOTOR VEHICLE LIGHTING DEVICE IMPLEMENTING A FUNCTION FOR WRITING ON THE GROUND

(71) Applicant: Valeo Vision, Bobigny (FR)

(72) Inventors: Sebastien Roels, Bobigny (FR); Marie Pellarin, Bobigny (FR); Sophie Clade, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 16/374,207

(22) Filed: Apr. 3, 2019

(65) Prior Publication Data
US 2019/0299843 A1    Oct. 3, 2019

(30) Foreign Application Priority Data

Apr. 3, 2018  (FR) ...................................... 18 52898

(51) Int. Cl.
*B60Q 1/02*        (2006.01)
*B60Q 1/00*        (2006.01)
(Continued)

(52) U.S. Cl.
CPC ............. *B60Q 1/0017* (2013.01); *B60Q 1/08* (2013.01); *F21S 41/143* (2018.01);
(Continued)

(58) Field of Classification Search
CPC ........ B60Q 1/00; B60Q 2400/00; B60Q 1/40; B60Q 1/50
(Continued)

(56) References Cited

U.S. PATENT DOCUMENTS

2015/0377442 A1   12/2015   Bhakta et al.
2017/0307166 A1*  10/2017   Courcier ................ F21S 41/24
(Continued)

FOREIGN PATENT DOCUMENTS

EP    3 216 650 A1    9/2017
FR    3 055 947 A1    3/2018
(Continued)

OTHER PUBLICATIONS

French Preliminary Search Report dated Nov. 28, 2018 in French Application 18 52898 filed on Apr. 3, 2018 (with English Translation of Categories of Cited Documents).

*Primary Examiner* — Thuy V Tran
(74) *Attorney, Agent, or Firm* — Oblon, McClelland, Maier & Neustadt, L.L.P.

(57) ABSTRACT

A lighting device for a motor vehicle, including a first lighting module adapted to project a pixelized first beam with a first resolution and a second lighting module adapted to project a pixelized low beam type second beam with a second resolution lower than the first resolution, the first and second lighting modules being such that the first and second beams overlap vertically at least in part to form a global beam, the device including a control unit able to control selectively a plurality of pixels of the first and second beams so as to project a motif in the global beam, characterized in that the control unit is adapted to control at least one pixel of each of the first and second beams when the motor vehicle enters a turn so as to create a movement of the motif in the global beam.

20 Claims, 3 Drawing Sheets

(51) Int. Cl.
*B60Q 1/08* (2006.01)
*H05B 33/08* (2020.01)
*F21S 41/24* (2018.01)
*F21S 41/143* (2018.01)
*F21S 41/663* (2018.01)
*F21S 41/255* (2018.01)
*F21S 41/153* (2018.01)
*F21S 41/32* (2018.01)
*F21W 102/19* (2018.01)
*F21W 103/60* (2018.01)

(52) U.S. Cl.
CPC ............ *F21S 41/153* (2018.01); *F21S 41/24* (2018.01); *F21S 41/255* (2018.01); *F21S 41/322* (2018.01); *F21S 41/663* (2018.01); *H05B 33/0854* (2013.01); *B60Q 1/00* (2013.01); *B60Q 2300/10* (2013.01); *B60Q 2400/00* (2013.01); *B60Q 2400/40* (2013.01); *B60Q 2400/50* (2013.01); *F21W 2102/19* (2018.01); *F21W 2103/60* (2018.01)

(58) Field of Classification Search
USPC ............ 362/487; 315/77, 82; 307/10.1, 10.8
See application file for complete search history.

(56) References Cited

U.S. PATENT DOCUMENTS

| | | |
|---|---|---|
| 2017/0334341 A1 | 11/2017 | Kurashige et al. |
| 2018/0010755 A1 | 1/2018 | Park et al. |
| 2018/0031202 A1* | 2/2018 | Bhakta .................. F21S 41/675 |
| 2018/0086254 A1* | 3/2018 | Morel .................. B60Q 1/0076 |
| 2018/0235349 A1 | 8/2018 | Keller et al. |

FOREIGN PATENT DOCUMENTS

| | | |
|---|---|---|
| JP | 2014-189198 | 10/2014 |
| JP | 2017-212169 | 11/2017 |

* cited by examiner

MOTOR VEHICLE LIGHTING DEVICE IMPLEMENTING A FUNCTION FOR WRITING ON THE GROUND

BACKGROUND OF THE INVENTION

Background of the Invention

The invention relates to the field of lighting and/or signalling lights, in particular for motor vehicles. The invention more particularly concerns a lighting device for motor vehicles able to project a pixelized light beam in order to project onto the road information for the driver of the vehicle.

Description of Related Art

In order for the information that this device projects onto the road to be clearly perceptible for the driver, it is necessary for the pixelized light beam to have a particularly high resolution. However, the technologies necessary for achieving such resolutions are costly, in particular when it is required to obtain a wide light beam, which is obligatory in the case of a low beam type beam.

In order to reduce the price of the lighting device, it has therefore been proposed, for example in the patent document EP 2 772 682, to divide the low beam type beam into a basic beam on which a pixelized beam of small size is superimposed. As a result, the global beam has an acceptable horizontal amplitude for a low beam type beam and a pixelized zone that can be used for motif projection in that global beam, by contrast between that pixelized zone and the basic beam.

Although this solution actually makes it possible to optimize the cost of the lighting device, it nevertheless gives rise to a problem when it is wished to implement a function of dynamic lighting of turns. That function consists in modifying the luminous characteristics of the low beam type beam when the vehicle enters a turn to improve the view of the driver in the turn without dazzling the other users of the road. For example the horizontal amplitude of the low beam type beam is increased in the direction of the turn or the intensity maximum of the low beam type beam is moved in the direction of the turn.

BRIEF SUMMARY OF THE INVENTION

Now in this case, because of the modification of the luminous characteristics of the basic beam, it is possible for the contrast between the pixelized zone and the basic beam not to be sufficient to enable the driver to perceive the motif projected in the global beam or for this contrast to change suddenly, causing a sudden modification of the pattern that may prove disturbing for the driver.

An object of the invention is to alleviate this problem and more precisely to propose a solution enabling projection of a motif in a low beam type beam, that motif remaining perceptible without sudden modification on use of a dynamic turn lighting function.

To this end, the invention proposes a lighting device for a motor vehicle, including a first lighting module adapted to project a pixelized first beam with a first resolution and a second lighting module adapted to project a pixelized low beam type second beam with a second resolution lower than the first resolution, the first and second lighting modules being such that the first and second beams vertically overlap at least partly to form a global beam, the device including a control unit able to control selectively a plurality of pixels of the first and second beams so as to project a motif in the global beam. According to the invention, the control unit is adapted to control at least one pixel of each of the first and second beams when the motor vehicle enters a turn so as to create a movement of said motif in the global beam.

Thanks to the invention, the motif is moved simultaneously with the movement of the characteristics of the global beam so that the contrast between the first and second light beams enabling generation of that motif remains constant when the dynamic turn lighting function is used. The perceptibility of the motif is therefore guaranteed, with no sudden variation of contrast.

Advantageously, the first and second lighting modules are such that:
  the pixelized first beam includes a number of pixels greater than the number of pixel of the pixelized low beam type second beam; and/or
  each pixel of the pixelized first beam has a width and/or a length strictly less than the minimum width and/or the minimum length respectively of the pixels of the pixelized low beam type second beam;
  the pixelized first beam has a horizontal amplitude less than the horizontal amplitude of the pixelized low beam type second beam.

There is meant by the pixel width, respectively the pixel length, the width, respectively the length, of that pixel when it is projected onto the road or onto a screen disposed for example at 25 metres from the lighting device. These dimensions, measured in degrees, correspond to the angular apertures of the elementary beams that can be activated selectively and that compose the pixelized first and second beams.

The resolution of the pixelized first and second beams can therefore be estimated on the basis of the number and the dimensions of the pixels constituting those beams relative to the amplitudes of those beams.

According to one embodiment, the first lighting module may be such that the pixelized first beam includes at least 400 pixels, or even at least 1000 pixels, or even at least 2000 pixels. This pixelized first beam may for example include 20 columns and 20 lines of pixels, in particular 32 columns and 32 lines of pixels.

The first module may advantageously be such that each pixel of the pixelized first beam has a width and/or a length less than 1°, in particular less than 0.5°, or even less than 0.3°.

Also advantageously, the first lighting module may be such that the pixelized first beam has a vertical amplitude of at least 5°, in particular at least 9°, and a horizontal amplitude of at least 5°, in particular at least 12°.

The first module may for example include:
  a pixelized light source including a plurality of elementary emitters arranged as a matrix, each of the elementary emitters being activatable selectively to emit an elementary light beam; and
  a projection optical element associated with said pixelized light source to project each of said elementary light beams in the form of a pixel, the set of pixels forming said pixelized beam.

The projection optical element is advantageously such that the pixelized beam has a vertical amplitude of at least 5° and a horizontal amplitude of at least 5°. These horizontal and vertical amplitudes make it possible to ensures that the pixelized beam is projected onto an area of the road that is sufficiently vast to implement functions of writing on the road by projection of a motif in this pixelized beam, and in particular ground marking display functions, driving assistance functions, and GPS information projection functions, or again adaptive lighting functions necessitating pixelization of the light beam and in particular non-dazzle high beam lamp type lighting functions or dynamic turn lighting type lighting functions. The projection optical element may therefore comprise one or more of the following optical components: lens, reflector, guide, collimator, prism.

If necessary, the pixelized light source may include at least 20 columns and at least 20 lines of elementary emitters, in particular at least 32 lines and columns of elementary emitters. These minimum numbers of columns and lines of elementary emitters, in combination with the vertical and horizontal amplitudes mentioned above, make it possible to obtain for each of the elementary light beams, when projected by the projection optical element, an angular aperture less than 0.5°, or even less than 0.3°. As a result a minimum resolution of the pixelized beam is obtained when it is projected onto the road that guarantees satisfactory perception of said projected motif in the pixelized beam by a user of the road and/or by the driver of the vehicle equipped in this way.

The elementary emitters and the projection optical element are advantageously such that two adjacent pixels, i.e. two adjacent pixels on the same line or in the same column, are contiguous, i.e. their adjacent edges coincide.

In one embodiment of the invention, the pixelized light source of the first module comprises at least one matrix of electroluminescent elements (termed a monolithic array) arranged in at least two columns by at least two lines. The electroluminescent source preferably comprises at least one matrix of monolithic electroluminescent elements, also termed a monolithic matrix.

In a monolithic matrix, the electroluminescent elements are grown from a common substrate and are electrically connected so as to be activatable selectively, individually or in subsets of electroluminescent elements. Thus each electroluminescent element or group of electroluminescent elements may form one of the elementary emitters of said pixelized light source that is able to emit light when its or their material is fed with electricity.

Various arrangements of electroluminescent elements can conform to this monolithic matrix definition, provided that the electroluminescent elements have one of their principal lengthwise dimensions substantially perpendicular to a common substrate and the distance between the elementary emitters formed by one or more electroluminescent elements electrically grouped together is short compared to the distances imposed in known arrangements of flat square chips soldered onto a printed circuit card.

The substrate may consist mostly of semiconductor material. The substrate may include one or more other materials, for example non-semiconductor materials.

These electroluminescent elements, of submillimetre size, are for example arranged projecting from the substrate so as to form rods of hexagonal section. The electroluminescent rods arise from a first face of a substrate. Each electroluminescent rod, formed here using gallium nitride (GaN), extends perpendicularly or substantially perpendicularly, projecting from the substrate, here based on silicon, other materials such as silicon carbide being usable without departing from the scope of the invention. For example, the electroluminescent rods could be produced from an alloy of aluminium nitride and gallium nitride (AlGaN) or from an alloy of phosphides of aluminium, indium and gallium (AlInGaP). Each electroluminescent rod extends along a lengthwise axis defining its height, the base of each rod being disposed in a plane of the upper face of substrate.

The electroluminescent rods of the same monolithic matrix advantageously have the same shape and the same dimensions. Each is delimited by an end face and by a circumferential wall that extends along the lengthwise axis of the rod. When the electroluminescent rods are doped and subjected to polarization, the resulting light that exits the semiconductor source is emitted essentially from the circumferential wall, it being understood that light rays may also exit from the end face. As a result each electroluminescent rod acts as a single electroluminescent diode and the brightness of this source is improved on the one hand by the density of the electroluminescent rods present and on the other hand by the size of the illuminating surface defined by the circumferential wall and which therefore extends over all the perimeter and all the height of the rod. The height of a rod may be between 2 and 10 µm inclusive, preferably 8 µm; the greatest dimension of the end face of a rod is less than 2 µm, preferably less than or equal to 1 µm.

Clearly, during the formation of the electroluminescent rods, the height may be modified from one zone of the pixelized light source to another, so as to increase the brightness of the corresponding zone if the mean height of the rods constituting it is increased. Thus a group of electroluminescent rods may have a height or heights different from that/those of another group of electroluminescent rods, these two groups being constituents of the same semiconductor light source comprising electroluminescent rods with submillimetre dimensions. The shape of the electroluminescent rods may also vary from one monolithic matrix to another, in particular the sections of the rods and the shape of the end face. The rods have a cylindrical general shape and may in particular have a polygonal, and more particularly hexagonal section shape. Clearly it is important that light can be emitted through the circumferential wall, whether the latter has a polygonal or circular shape. Moreover, the end face may have a substantially plane shape perpendicular to the circumferential wall so that it extends substantially parallel to the upper face of the substrate, or may have a convex or pointed shape at its centre so as to multiply the directions of emissions of the light exiting from this end face.

The electroluminescent rods are arranged in a two-dimensional matrix. This arrangement could be such that the rods are arranged in a quincunx. As a general rule the rods are disposed at regular intervals on the substrate and the distance separating two immediately adjacent electroluminescent rods in each of the dimensions of the matrix must be at the minimum equal to 2 µm, preferably between 3 µm and 10 µm inclusive, in order for the light emitted by the circumferential wall of each rod to be able to exit the matrix of electroluminescent rods. Moreover, these separation distances measured between two lengthwise axes of adjacent rods do not exceed 100 µm.

According to another embodiment, the monolithic matrix may include electroluminescent elements formed by epitaxially grown layers of electroluminescent elements, in particular a first layer of n-doped GaN and a second layer of p-doped GaN, on a single substrate, for example of silicon carbide, that is cut (by milling and/or ablation) to form a plurality of elementary emitters arising from the same substrate. A design of this kind results in a plurality of electroluminescent blocks all arising from the same substrate and electrically connected to one another so as to be activatable selectively.

In one example of this other embodiment, the substrate of the monolithic matrix may have a thickness between 100 μm and 800 μm inclusive, in particular equal to 200 μm; each block may have a width and a length each between 50 μm and 500 μm inclusive, preferably between 100 μm and 200 μm inclusive. In a variant the length and the width are equal. The height of each block is less than 500 μm, preferably less than 300 μm. Finally, the exit surface of each block may be formed through the substrate, on the side opposite the epitaxial growth. The distance between contiguous elementary emitters may be less than 1 μm, in particular less than 500 nm, and is preferably less than 200 nm.

According to another embodiment that is not shown, also with electroluminescent rods projecting from the same substrate, as described above, or with electroluminescent blocks obtained by cutting superposed electroluminescent layers on the same substrate, the monolithic matrix may further include a layer of a polymer material in which the electroluminescent elements are at least partly buried. This layer may therefore extend over the whole of the substrate or only around a particular group of electroluminescent elements. The polymer material, which may in particular be based on silicone, creates a protective layer that makes it possible to protect the electroluminescent elements without impeding the diffusion of the light rays. Moreover, it is possible to integrate into this layer of polymer material wavelength conversion means, for example luminophores, able to absorb at least some of the rays emitted by one of the elements and to convert at least some of said absorbed excitation light into emitted light at a wavelength different form that of the excitation light. The luminophores may interchangeably be buried in the mass of the polymer material or disposed on the surface of the layer of that polymer material.

The pixelized light source may further include a reflective material coating to deviate the light rays toward the exit surfaces of the light source.

The electroluminescent elements with submillimetre dimensions define a particular exit surface in a plane substantially parallel to the substrate. Clearly the shape of that exit surface is defined as a function of the number and the arrangement of the electroluminescent elements that constitute it. A substantially rectangular shape of the emission surface can thus be defined, it being understood that the latter may vary and assume any shape without departing from the scope of the invention.

The monolithic matrix or matrices adapted to emit light rays may be coupled to the control unit. The control unit may be mounted on one or more matrices, the combination thus forming a lighting submodule. In this case, the control unit may include a central processor unit coupled to a memory in which is stored a computer program that comprises instructions enabling the processor to execute steps generating signals for controlling the light source. The control unit may be an integrated circuit, for example an application-specific integrated circuit (ASIC) or an application-specific standard product (ASSP).

Alternatively, the pixelized light source may be formed by assembling at least one light source formed of at least one electroluminescent diode emitting light and a matrix of optoelectronic elements, for example a matrix of micromirrors (also known as a digital micromirror device (DMD)) that reflects the light rays from said at least one light source toward the projection optical element. If necessary, a collection optical element enables collection of the rays from the at least one light source in order to concentrate them and to direct them toward the surface of the micromirror matrix. Each micromirror is able to pivot between two fixed positions, a first position in which the light rays are reflected toward the projection optical element and a second position in which the light rays are reflected in a different direction to the projection optical element. The two fixed positions are oriented in the same manner for all the micromirrors and form relative to a reference plane supporting the micromirror matrix an angle that is characteristic of the micromirror matrix and defined in its specifications. That angle is generally less than 20° and usually has a value of approximately 12°. Thus each micromirror reflecting a small portion of the light rays incident on the micromirror matrix forms an elementary emitter of the pixelized light source, actuation and change of position control enabling selective activation of this elementary emitter to emit or not an elementary light beam.

In another variant, the pixelized light source may be formed by a laser scanning system in which a laser source emits a laser beam towards scanning means configured to scan with the laser beam the surface of a wavelength converter element, which surface is imaged by the projection optical element. The beam is scanned by the scanning means at a speed sufficiently high for the human eye not to perceive its movement in the projected image. The synchronized control of the lighting of the laser source and the movement of scanning the beam enables generation of a matrix of elementary emitters activatable selectively at the level of the surface of the wavelength converter element. Here the scanning means consist of a mobile micromirror enabling scanning of the surface of the wavelength converter element by reflection of the laser beam. The micromirrors mentioned as scanning means may for example be of micro-electromechanical system (MEMS) type. However, the invention is in no way limited to these scanning means and may use other kinds of scanning means such as a series of mirrors arranged on a rotary element, the rotation of the element causing the scanning of the transmission surface by the beam laser.

If necessary the second lighting module may be such that the pixelized low beam type second beam includes between 5 and 400 pixels, in particular 9 pixels.

For example, the pixelized low beam type second beam may include a single line of pixels or instead a plurality of lines of pixels disposed one on top of the other.

The second module may advantageously be such that each pixel of the pixelized low beam type second beam has a width and/or a length strictly greater than 0.5°, and in particular greater than 1°.

Again advantageously, the second lighting module may be such that the pixelized low beam type second beam has a vertical amplitude of at least 5° and a horizontal amplitude of at least 15°.

By low beam type beam is meant a light beam intended to light the road without dazzling the other users of the road. To this end, the second lighting module is such that the pixelized low beam type second beam has a low beam type upper cut-off, that upper cut-off being defined by the upper edges of the pixels constituting the uppermost line of this second light beam.

The low beam type upper cut-off may for example include a horizontal portion and an oblique portion. See for example ECE regulation no 123 which defines a regulatory cut-off including a horizontal portion at 0.57° above the horizon and an oblique portion inclined at 15° relative to the horizontal portion.

The low beam type upper cut-off may instead include a single flat horizontal portion.

In one embodiment of the invention, the first and second lighting modules are such that the first and second beams overlap so that the pixelized first beam extends in the global beam exclusively below the upper cut-off of the pixelized low beam type second beam.

If necessary, the global beam includes an upper horizontal cut-off formed exclusively by the upper horizontal cut-off of the pixelized low beam type second beam. In this case, the pixelized first beam is therefore completely enclosed within the pixelized low beam type second beam and the vertical overlap is then total. There is therefore obtained the benefit of a projection zone entirely dedicated to a writing on the road function and it is guaranteed that in the event of a problem at the level of the first module the totality of the low beam lighting function is retained.

In another embodiment of the invention, the first and second lighting modules are such that the first and second beams overlap so that the pixelized first beam extends in the global beam above and below the upper cut-off of the pixelized low beam type second beam.

If necessary, the portion of the pixelized first beam extending above the pixelized low beam type second beam may produce a portion, for example an oblique portion, of a low beam type cut-off intended to be associated with the upper cut-off of the second beam. In this case, this portion may for example be moved when the vehicle enters a turn to improve the performance of the dynamic turn lighting function. Also, this portion of the pixelized first beam extending above the pixelized low beam type second beam is able to produce a selective high beam type lighting function.

The second lighting module is advantageously such that the pixelized low beam type second beam extends horizontally and substantially symmetrically on respective opposite sides of a vertical axis and the first lighting module is such that the pixelized first beam extends horizontally and substantially asymmetrically on respective opposite sides of that vertical axis. This vertical axis may for example be a vertical axis intersecting the optical axis of said lighting device. In the case of a pixelized low beam type second beam including a horizontal cut-off portion and an oblique cut-off portion the vertical axis may in particular pass through the junction of these two horizontal and oblique portions.

The pixelized first beam may preferably extend horizontally mostly on the vehicle exterior side when the lighting device is mounted on the vehicle. It is therefore guaranteed that the projection zone for the writing on the ground function is sufficiently extensive for the motive to be movable whatever the curvature of the turn entered by the vehicle.

The first and second lighting modules are advantageously such that at least one edge of each pixel of the pixelized first beam coincides with an edge of a pixel of the pixelized low beam type second beam.

By coincident pixel edges is meant a superposition of those edges when the pixels are projected onto the road or onto a screen disposed for example at 25 metres from the lighting device. The first and second lighting modules are preferably such that at least one vertical edge of each pixel of the pixelized low beam type second beam coincides with a vertical edge of a pixel of the pixelized low beam type first beam. If necessary, the width of the pixels of the second beam is made proportional to the width of the pixels of the first beam. It is thus possible to obtain an overlap of the first and second beams with interleaving of the pixels so that the global beam has a satisfactory homogeneity, that is to say with no non-homogeneity between two pixels of the global beam.

The control unit is advantageously adapted to control selectively the luminous intensity of said plurality of pixels of the first and second beams so that the motif is projected in the global beam by a difference of intensity between those pixels of the first and second light beams.

There is meant by controlling the luminous intensity of a pixel lighting or extinguishing that pixel and under-intensification or over-intensification of the luminous intensity of that pixel.

The motif that is intended to be projected is advantageously defined by a matrix of points and the control unit is adapted to control selectively the luminous intensity of a plurality of pixels of the first and second beams situated in a projection zone situated at the level of the overlap of the first and second beams so as to generate a contrast between each pair of pixels of that plurality of pixels that overlap, each contrast corresponding to a point of said matrix of points.

In other words, the overlap of the pixelized first and second beams defines a matrix projection zone that can be controlled to display a motif therein.

If necessary the motif may be generated by positive contrasts, i.e. by positive intensity differences in each pair of pixels between the pixel of the first beam and the pixel of the second beam, for example by over-intensification of the pixel of the first beam and/or by under-intensification of the pixel of the second beam.

The motif may instead be generated by negative contrasts, i.e. by negative intensity differences in each pair of pixels between the pixel of the first beam and the pixel of the second beam for example by under-intensification of the pixel of the first beam and/or by over-intensification of the pixel of the second beam.

If required, the control unit is adapted to reduce the luminous intensity of all the pixels of the pixelized low beam type second beam at the level of said projection zone. If necessary, the luminous intensity of the rest of the pixels of the pixelized low beam type second beam outside of the projection zone remains unchanged. The contrast and therefore the perceptibility of the pattern relative to the rest of the pixelized low beam type second beam is therefore improved.

According to one embodiment of the invention, the control unit is adapted to control the pixels of the first beam and/or of the second beam when the motor vehicle enters a turn so as to modify the luminous intensity of the global beam in the direction of the turn. If necessary the control unit is adapted to control the pixels of the first beam and/or the second beam when the motor vehicle enters a turn:
  to increase the horizontal amplitude of the global beam in the direction of the turn, the pixels of the global beam being for example progressively lit or over-intensified in the direction of the turn, and/or
  to move the maximum intensity of the global beam in the direction of the turn, and/or
  to move a portion of an upper cut-off, in particular an oblique portion of an upper cut-off, of the global beam in the direction of the turn.

The control unit is advantageously adapted to control selectively the luminous intensity of said plurality of pixels of the first and second beams situated in the projection zone so as to move each contrast between a pair of pixels of that plurality of pixels that overlap toward another pair of pixels of that plurality of pixels that overlap in the direction of the turn. There is meant by movement of a contrast of a first pair of pixels to a second pair of pixels controlling that second pair of pixels so that the contrast of that second pair is substantially identical to that of the first pair. This therefore guarantees the preservation of the contrast on the movement of the motif so as to not to disturb the driver.

The lighting device advantageously includes a third lighting module adapted to project a pixelized high beam type third beam, the first and third lighting modules being such that the first and third beams vertically overlap at least partially.

The invention also consists in a lighting system for a motor vehicle, the system including a lighting device according to the invention as described above and a device for detection of a turn intended to be taken by the motor vehicle, the control unit of the lighting device being adapted to receive information from said turn detection device and to control the pixels of the beams projected by the lighting modules of the lighting device as a function of said information.

The detection device may in particular be a video camera filming the road with associated image processing software or a steering wheel angle sensor.

The system advantageously includes a device for detection of traffic conditions of the vehicle and/or for reception of information relating to the traffic conditions of the vehicle, and the control unit is advantageously adapted to receive information relating to those traffic conditions from said detection and/or reception device and to control selectively said plurality of pixels of the first and second beams so as to project a motif in the global beam concerning said traffic conditions.

For example the detection and/or receiving device may be a video camera, a lidar, a GPS device, or a wireless receiver. If necessary, the information on detected or received traffic conditions may be the presence or the absence of a marking on the ground, an optimum trajectory to be taken by the vehicle, GPS navigation information, the presence of a road sign, the presence of an obstacle or of a hazard or the state of the traffic.

BRIEF DESCRIPTION OF THE DRAWINGS

Other features and advantages of the present invention will be better understood with the aid of the description of examples and of the drawings in which.

Unless specifically indicated to the contrary, technical features described in detail for a given embodiment may be combined with the technical features described by way of nonlimiting example in the context of other embodiments described.

Figure 1A:
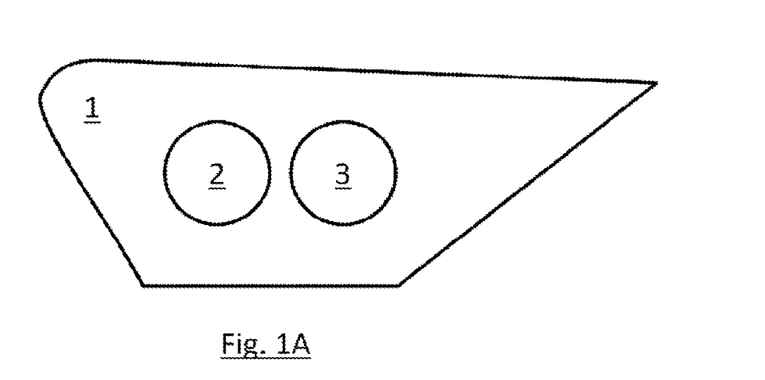
FIGS. 1A and 1B show front and plan views of a lighting device according to a preferred embodiment of the invention.
Figure 1B:
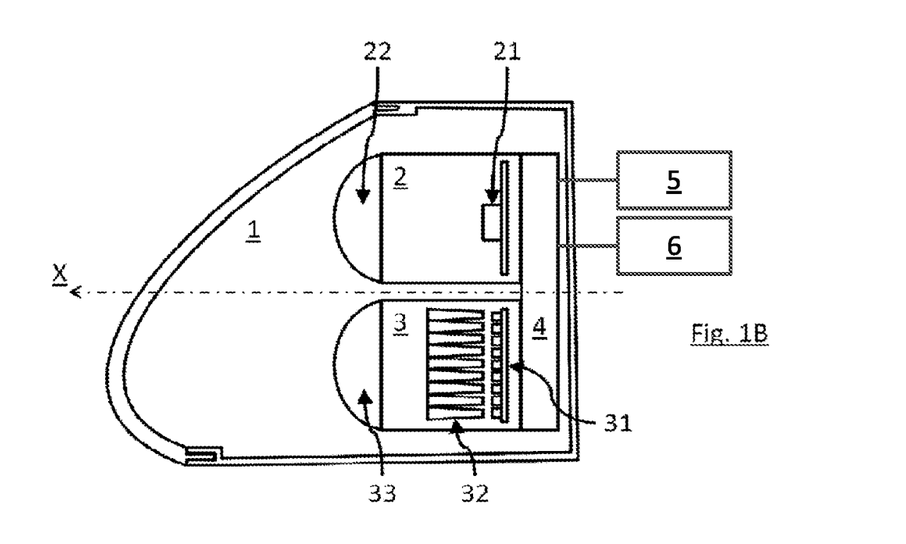

There has been represented in FIGS. 1A and 1B a lighting device 1 according to one embodiment of the invention. That lighting device includes a first lighting module 2 adapted to project a pixelized first beam HR and a second lighting module 3 adapted to project a pixelized low beam type second beam LB. The pixelized first and second beams HR and LB have been represented in FIG. 1C projected onto a screen situated at 25 metres from the lighting device 1 and on which are shown a horizontal axis H-H representing the horizon and a vertical axis V-V perpendicular to the horizontal axis H-H and crossing the optical axis X of the lighting device 1.

The first module 2 includes:
a pixelized light source 21 including 900 elementary emitters arranged in a matrix of 20 lines by 45 columns, each of the elementary emitters being activatable selectively to emit an elementary light beam; and
a projection optical element 22 associated with said light source to project each of said elementary light beams in the form of a pixel having a width and a length of 0.3°.

Figure 1C:
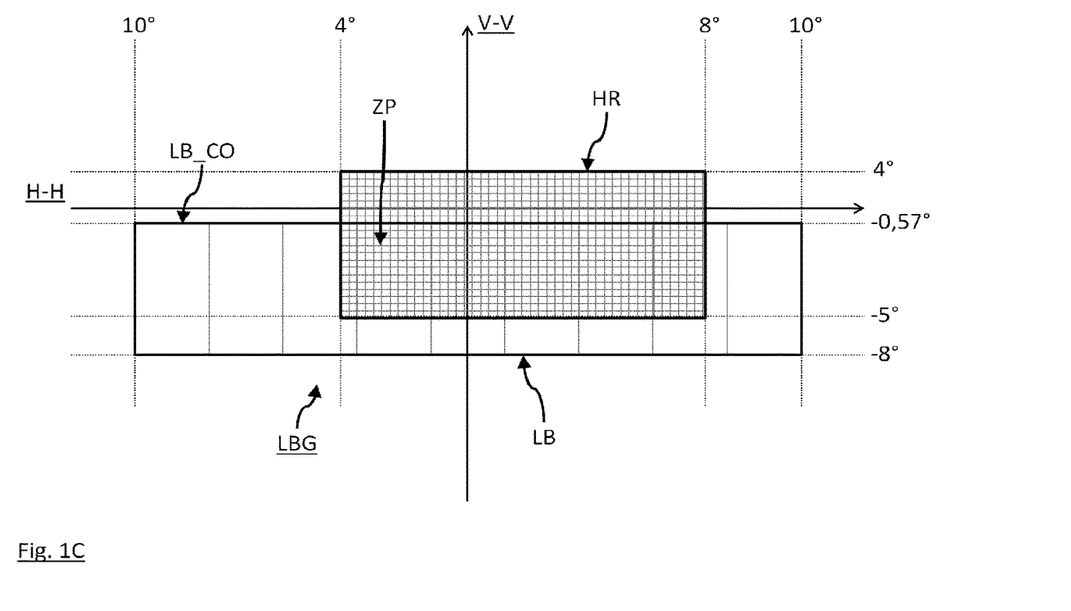
FIG. 1C shows the light beams projected by the luminous device from FIGS. 1A and 1B.

The set of pixels projected by the first module 2 form said pixelized first beam HR. That beam HR has a horizontal amplitude of 12° and a vertical amplitude of 9°. It extends asymmetrically on respective opposite sides of the vertical axis V-V. In the present case, the lighting device 1 being a righthand headlamp of the vehicle, the beam HR extends 4° on the vehicle interior side and 8° on the vehicle exterior side. It equally extends 4° above the horizontal axis H-H and 5° below the horizontal axis H-H.

DETAILED DESCRIPTION OF THE INVENTION

In the embodiment described, the light source 21 comprises a matrix of monolithic electroluminescent elements as described above.

There may be provision for replacing the light source 21 by any other type of pixelized light source described above, such as for example a matrix of electroluminescent diodes or a light source associated with a matrix of optoelectronic elements such as micromirrors.

The first lighting module may comprise elements other than those described above. Those elements will not be described in the context of the present invention because they do not interact functionally with the features according to the invention.

The second module 3 includes:
a matrix 31 of elementary emitters including 9 electroluminescent diodes activatable selectively and arranged along a line, each diode being able to emit an elementary light beam;
a plurality 32 of primary optical elements disposed in front of the matrix 31 to collect, shape and guide the elementary light beams coming form each of the electroluminescent diodes; and
a projection optical element 33 disposed in front of the primary optical elements to project each of said elementary light beams coming from the primary optical elements in the form of a pixel having a width of 3° and a length of 5°.

See in particular the document FR3056692 which describes the principle of operation of a module of this kind.

The pixels projected by the second module 3 form said pixelized second beam LB. This beam LB has a horizontal amplitude of 20° and a vertical amplitude of 8°.

The second lighting module 3 is such that the pixelized low beam type second beam has a low beam type upper cut-off LB_CO. In the present case, the primary optical elements 32 are arranged so that their exit surfaces are abutted so that the lower edges of those surfaces join and are aligned and the projection optical element 33 is focused on these exit surfaces. As a result, the projection optical element 33 comes to image these lower edges in an upper cut-off LB_CO defined by the upper edges of the pixels constituting this second light beam.

In the example described, the upper cut-off includes a single flat horizontal portion disposed 0.57° below the horizontal axis H-H.

The pixelized second beam therefore forms a pixelized low beam type beam.

It is therefore seen in FIG. 1C that:
the pixelized first beam HR includes a number of pixels greater than the number of pixels of the pixelized low beam type second beam LB;
each pixel of the pixelized first beam HR has a width and a length respectively less than the width and the length of the pixels of the pixelized low beam type second beam LB; and
the pixelized first beam HR has a horizontal amplitude less than the horizontal amplitude of the pixelized low beam type second beam LB.

It therefore follows that the resolution of the pixelized first beam HR is greater than the resolution of the pixelized low beam type second beam LB.

According to the invention, the first and second lighting modules 2 and 3 are such that the first and second beams HR and LB vertically overlap in part to form a global beam LBG. The pixelized first beam HR therefore extends above and below the upper cut-off LB_CO of the pixelized low beam type second beam LB.

The overlap is such that each vertical edge of each pixel of the pixelized low beam type second beam LB coincides with a vertical edge of a pixel of the pixelized first beam HR.

Finally, the lighting device 1 includes a control unit 4 able to control selectively the luminous intensity of each of the pixels of the first and second beams HR and LB as a function of control instructions that it receives, for example by selectively lighting, extinguishing the elementary emitters of the light sources 21 and 31 or again by increasing or decreasing the electrical power supplied to each of these elementary emitters.

The overlap of the pixelized first and second beams defines a matrix projection zone ZP formed by the overlapping of a plurality of pixels of the pixelized first and second beams HR and LB. Each pixel of the projection zone ZP is therefore formed by a pair consisting of a pixel of the first beam HR and a pixel of the second beam LB that overlap one another. This pixel of the projection zone ZP is consequently controllable by the control unit 4, conjointly controlling the luminous intensity of each pixel of the pair of pixels.

Figure 2A:
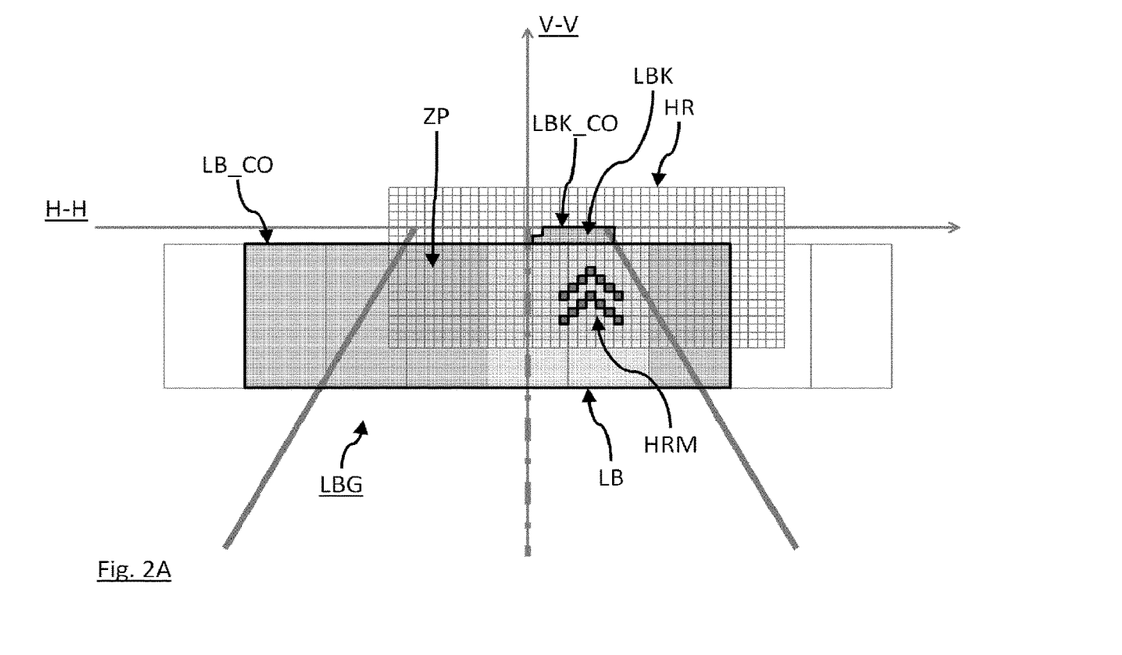
FIG. 2A shows the light beams projected onto the road by the lighting device from FIGS. 1A and 1B when the vehicle is travelling on a straight road and FIG. 2B shows the light beams projected onto the road by the lighting device from FIGS. 1A and 1B when the vehicle enters a turn.

There has been represented in FIG. 2A a first operating mode of the lighting device 1 from FIGS. 1A to 1C. In this mode the vehicle equipped with the lighting device 1 is travelling in a straight line. This vehicle is equipped with a device 5 for detecting a turn intended to be taken by the motor vehicle and a device 6 for detection and reception of information relating to the traffic conditions of the vehicle.

The device 5 for detection of a turn detects that the vehicle is travelling in a straight line and the device 6 for detection of information relating to the traffic conditions of the vehicle receives GPS information to be transmitted to the driver via the lighting device 1.

On the one hand, the control unit 4 controls a plurality of pixels of the pixelized low beam type second beam LB to light the entirety of the road, the rest of the pixels of this second beam LB therefore remaining extinguished.

On the other hand, the control unit 4 controls a first plurality of pixels LBK of the pixelized first beam HR extending above the cut-off LB_CO to complete the second beam LB and to form an oblique cut-off portion LBK_CO that is associated with the cut-off LB_CO to form conjointly a regulatory low beam type cut-off profile.

Finally, the control unit 4 controls a second plurality of pixels HRM of the pixelized first beam HR in the projection zone ZP so as to create local luminous over-intensifications in the pixels of the second beam LB with which this second plurality of pixels HRM overlaps, the rest of the pixels of the pixelized first beam remaining extinguished. These over-intensifications therefore create positive contrasts that consequently form a motif in the projection zone that indicates to the driver the direction to take.

In order to strengthen the contrast and to render the motif even more perceptible, the control unit 4 reduces the luminous intensity of the pixels of the second beam LB with which the second plurality of pixels HRM overlap.

The control unit 4 implements a writing on the road function.

Figure 2B:
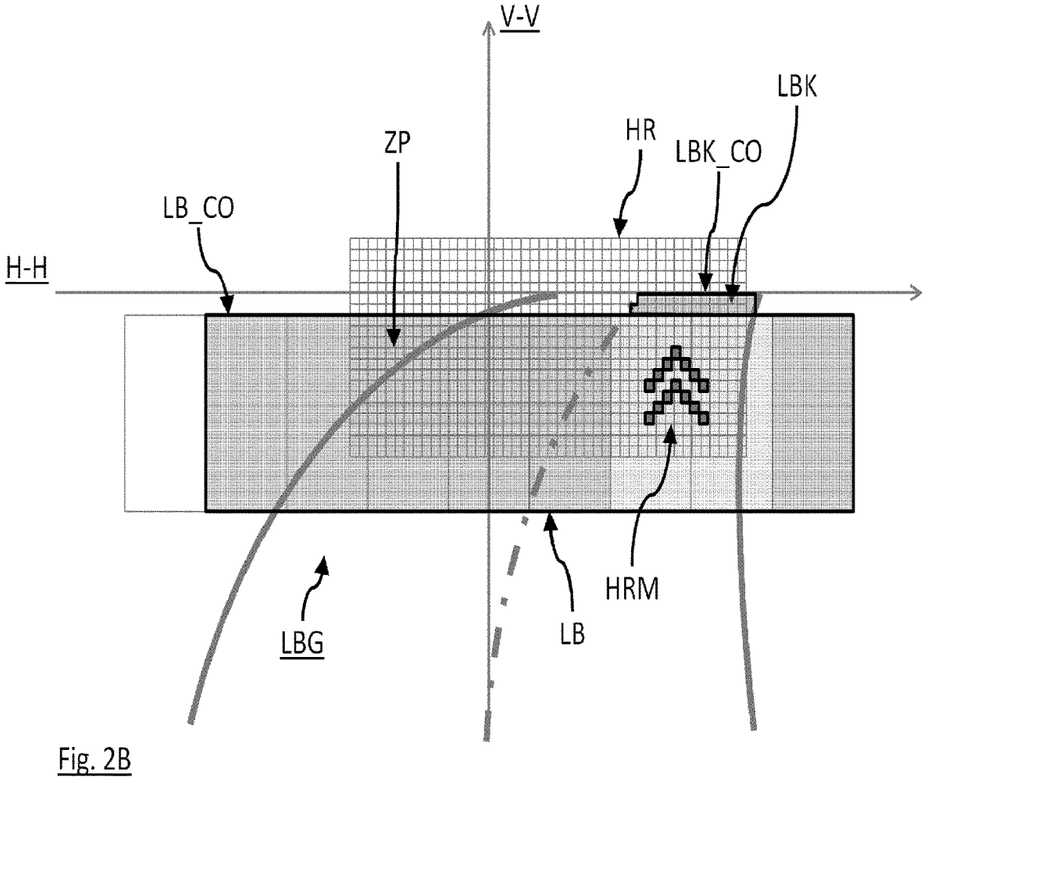

There has been represented in FIG. 2B a second mode of operation of the lighting device 1 from FIGS. 1A to 1C, following on from the mode of operation from FIG. 2A. In this mode the vehicle equipped with the lighting device 1 enters a turn. The device 5 for detection of a turn therefore detects that the vehicle is entering a turn.

Also, the control unit 4 implements a dynamic turn lighting function by:
lighting pixels of the pixelized low beam type second beam LB in the direction of the turn,
moving the oblique cut-off portion LBK_CO of the pixelized first beam HR in the direction of the turn, progressively extinguishing the first plurality of pixels LBK from FIG. 2A and lighting another plurality of pixels LBK of the pixelized first beam HR on the side of the turn.

In order to preserve the contrasts between the pixels of the first and second beams HR and LB at the level of the projection zone ZP that enable the driver to perceive the motif, the control unit 4 then also moves the motif in the direction of the turn by progressively extinguishing the second plurality of pixels HRM from FIG. 2A and lighting another plurality of pixels HRM of the pixelized first beam HR on the side of the turn. As before, the control unit 4 reduces the luminous intensity of the pixels of the second beam LB with which the second plurality of pixels HRM overlap.

This therefore guarantees the preservation of the contrast by the movement of the motif at the same time as the movement of some parts of the pixelized low beam type beam so that the driver is not disturbed. The motif moreover remains perceptible by the driver, by remaining in position in the projection zone from the driver's point of view.

The foregoing description explains clearly how the invention makes it possible to achieve the objectives set for it and in particular to propose a solution enabling projection of a motif in a low beam type beam, that motif remaining perceptible without sudden modification during the execution of a dynamic turn lighting function. The lighting device according to the invention makes it possible to preserve the contrast characteristics enabling the motif to be perceived when the dynamic turn lighting function is used.

The invention is not limited to the embodiments specifically given in this document by way of nonlimiting example and in particular extends to all equivalent means and any technically operative combinations of those means. Accordingly the characteristics, the variants and the various embodiments of the invention may be combined with one another in diverse combinations provided that they are not incompatible or mutually exclusive.

There may in particular be imagined variants of the invention comprising only a selection of the features described provided that, according to the invention, the control unit controls at least one pixel of each of the first and second beams when the motor vehicle enters a turn so as to create a movement of said motif in the global beam.

The invention claimed is:

1. Lighting device for a motor vehicle, including a first lighting module adapted to project a pixelized first beam with a first resolution and a second lighting module adapted to project a pixelized low beam type second beam with a second resolution lower than the first resolution, the first and second lighting modules being such that the first and second beams overlap vertically at least in part to form a global beam, the lighting device including a control unit able to control selectively a plurality of pixels of the first and second beams so as to project a motif in the global beam,
wherein the control unit is adapted to control at least one pixel of each of the first and second beams when the motor vehicle enters a turn so as to create a movement of said motif in the global beam.

2. Lighting device according to claim 1, wherein the first and second lighting modules are such that:
the pixelized first beam includes a number of pixels greater than the number of pixels of the pixelized low beam type second beam; and/or
each pixel of the pixelized first beam has a width and/or a length strictly less than a minimum width and/or a minimum length respectively of each pixel of the pixelized low beam type second beam;
the pixelized first beam has a horizontal amplitude less than the horizontal amplitude of the pixelized low beam type second beam.

3. Lighting device according to claim 2, wherein the first and second lighting modules are such that the first and second beams overlap so that the pixelized first beam extends in the global beam exclusively below an upper cut-off of the pixelized low beam type second beam.

4. Lighting device according to claim 3, wherein the second lighting module is such that the pixelized low beam type second beam extends horizontally and substantially symmetrically on respective opposite sides of a vertical axis and the first lighting module is such that the pixelized first beam extends horizontally and substantially asymmetrically on respective opposite sides of that vertical axis.

5. Lighting device according to claim 2, wherein the first and second lighting modules are such that the first and second beams overlap so that the pixelized first beam extends in the global beam above and below an upper cut-off of the pixelized low beam type second beam.

6. Lighting device according to claim 2, wherein the second lighting module is such that the pixelized low beam type second beam extends horizontally and substantially symmetrically on respective opposite sides of a vertical axis and the first lighting module is such that the pixelized first beam extends horizontally and substantially asymmetrically on respective opposite sides of that vertical axis.

7. Lighting device according to claim 2, wherein the control unit is adapted to control selectively the luminous intensity of said plurality of pixels of the first and second beams so that the motif is projected in the global beam by a difference of intensity between those pixels of the first and second light beams.

8. Lighting device according to claim 2, wherein the first lighting module includes a matrix of monolithic electroluminescent elements.

9. Lighting system for a motor vehicle, the system including a lighting device according to claim 2 and a device for detection of a turn intended to be taken by the motor vehicle, the control unit of the lighting device being adapted to receive information from said turn detection device and to control the pixels of the beams projected by the lighting modules of the lighting device as a function of said information.

10. Lighting device according to claim 1, wherein the first and second lighting modules are such that the first and second beams overlap so that the pixelized first beam extends in the global beam above and below an upper cut-off of the pixelized low beam type second beam.

11. Lighting device according to claim 1, wherein the second lighting module is such that the pixelized low beam type second beam extends horizontally and substantially symmetrically on respective opposite sides of a vertical axis and the first lighting module is such that the pixelized first beam extends horizontally and substantially asymmetrically on respective opposite sides of that vertical axis.

12. Lighting device according to claim 1, wherein the control unit is adapted to control selectively the luminous intensity of said plurality of pixels of the first and second beams so that the motif is projected in the global beam by a difference of intensity between those pixels of the first and second light beams.

13. Lighting device according to claim 12, wherein the motif is defined by a matrix of points and the control unit is adapted to control selectively the luminous intensity of a plurality of pixels of the first and second beams situated in a projection zone situated at the level of the overlap of the first and second beams so as to generate a contrast between each pair of pixels of that plurality of pixels that overlap, each contrast corresponding to a point of said matrix of points.

14. Lighting device according to claim 13, wherein the control unit is adapted to reduce the luminous intensity of all the pixels of the pixelized low beam type second beam at the level of said projection zone.

15. Lighting device according to claim 14, wherein the control unit is adapted to control the pixels of the first beam and/or of the second beam when the motor vehicle enters a turn so as to modify the luminous intensity of the global beam in the direction of the turn.

16. Lighting device according to claim 13, wherein the control unit is adapted to control the pixels of the first beam and/or of the second beam when the motor vehicle enters a turn so as to modify the luminous intensity of the global beam in the direction of the turn.

17. Lighting device according to claim 16, wherein the control unit is adapted to control selectively the luminous intensity of said plurality of pixels of the first and second beams situated in the projection zone so as to move each contrast between a pair of pixels of that plurality of pixels that overlap toward another pair of pixels of that plurality of pixels that overlap in the direction of the turn.

18. Lighting device according to claim 1, wherein the first lighting module includes a matrix of monolithic electroluminescent elements.

19. Lighting system for a motor vehicle, the system including a lighting device according to claim 1 and a device for detection of a turn intended to be taken by the motor vehicle, the control unit of the lighting device being adapted to receive information from said turn detection device and to control the pixels of the beams projected by the lighting modules of the lighting device as a function of said information.

20. Lighting system according to claim 19, wherein the lighting system includes a device for detection of traffic conditions of the vehicle and/or for reception of information relating to the traffic conditions of the vehicle, and in that the control unit is adapted to receive information relating to those traffic conditions from said detection and/or reception device and to control selectively said plurality of pixels of the first and second beams so as to project a motif in the global beam concerning said traffic conditions.

* * * * *